United States Patent
Martin et al.

(10) Patent No.: US 7,266,778 B2
(45) Date of Patent: Sep. 4, 2007

(54) FREEZABLE PROJECTION DISPLAY

(75) Inventors: Eric T. Martin, Corvallis, OR (US); Andrew Koll, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 745 days.

(21) Appl. No.: 10/263,996

(22) Filed: Oct. 2, 2002

(65) Prior Publication Data

US 2004/0066399 A1  Apr. 8, 2004

(51) Int. Cl.
*G06F 3/00* (2006.01)
*G06F 9/00* (2006.01)
*G06F 17/00* (2006.01)

(52) U.S. Cl. ............... 715/764; 715/856; 715/512; 348/791; 349/25; 349/26; 345/530; 345/157

(58) Field of Classification Search ............ 715/530, 715/856, 512, 762, 763, 764; 345/863, 157, 345/530; 348/791; 349/26, 25
See application file for complete search history.

(56) References Cited

U.S. PATENT DOCUMENTS

| | | | |
|---|---|---|---|
| 4,202,010 A | | 5/1980 | Hareng et al. |
| 5,053,675 A | * | 10/1991 | Thioulouse ............ 313/505 |
| 5,782,548 A | * | 7/1998 | Miyashita ............. 353/42 |
| 5,982,352 A | * | 11/1999 | Pryor ................ 345/156 |
| 6,186,630 B1 | * | 2/2001 | Miyashita .............. 353/42 |
| 6,377,242 B1 | * | 4/2002 | Sweed ............... 345/158 |
| 6,377,249 B1 | * | 4/2002 | Mumford .............. 345/179 |
| 6,734,847 B1 | * | 5/2004 | Baldeweg et al. ......... 345/419 |
| 7,050,121 B2 | * | 5/2006 | Kim ................. 348/744 |
| 2001/0030668 A1 | * | 10/2001 | Erten et al. ............ 345/863 |
| 2002/0036694 A1 | * | 3/2002 | Merril ............... 348/220 |

FOREIGN PATENT DOCUMENTS

| | | |
|---|---|---|
| FR | 2581228 | 10/1986 |
| FR | 2652185 | 3/1991 |
| JP | 08194202 A * | 7/1996 |
| JP | 01-105989 | 3/1998 |
| WO | WO00/79791 | 12/2000 |
| WO | WO02/39417 | 5/2002 |

OTHER PUBLICATIONS

European Search Report dated Jan. 31, 2006.

* cited by examiner

*Primary Examiner*—Tadesse Hailu
*Assistant Examiner*—Anita Datta Chaudhuri

(57) ABSTRACT

A display system and method are provided. The system typically includes a display configured to control visible light, as well as to sense an optical signal projected thereon, the display being adapted to freeze a projected image by storing the optical signal associated with the live projected image in memory associated with the display and controlling visible light corresponding to the stored optical signal to form a frozen projection image.

55 Claims, 3 Drawing Sheets

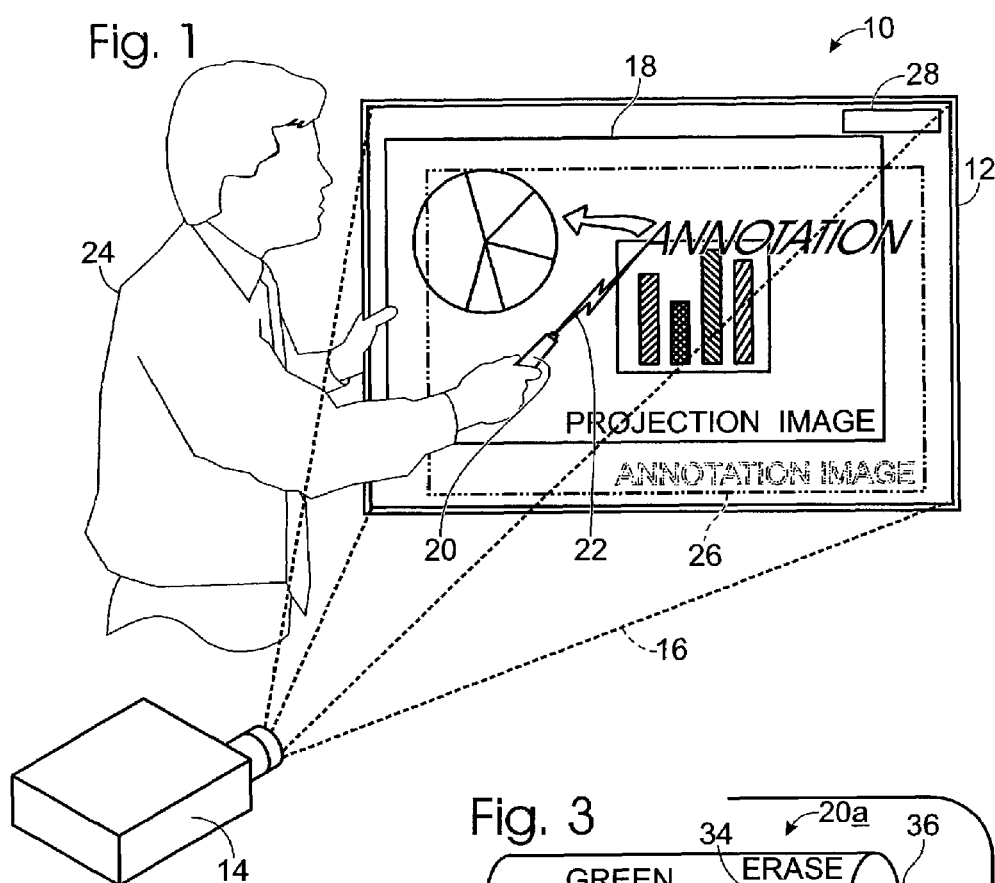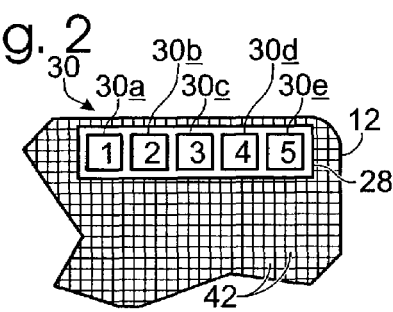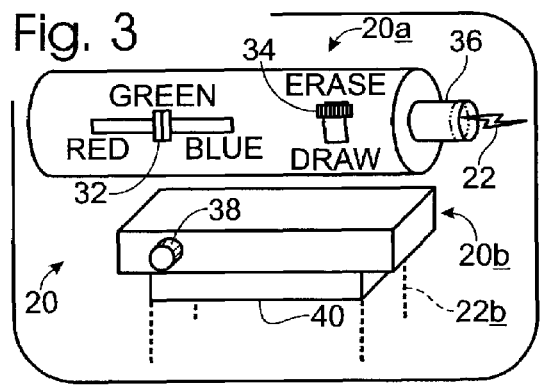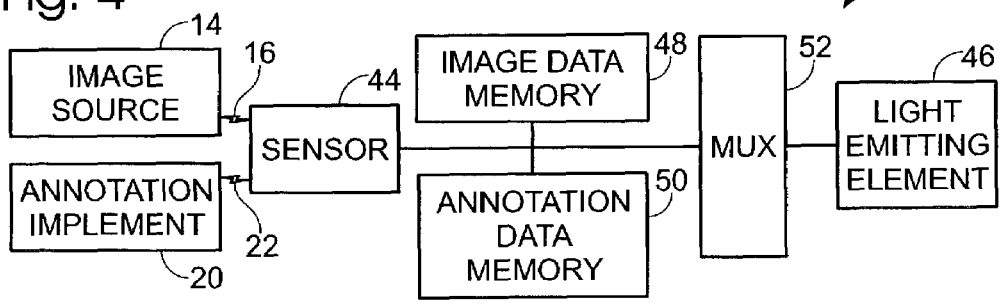

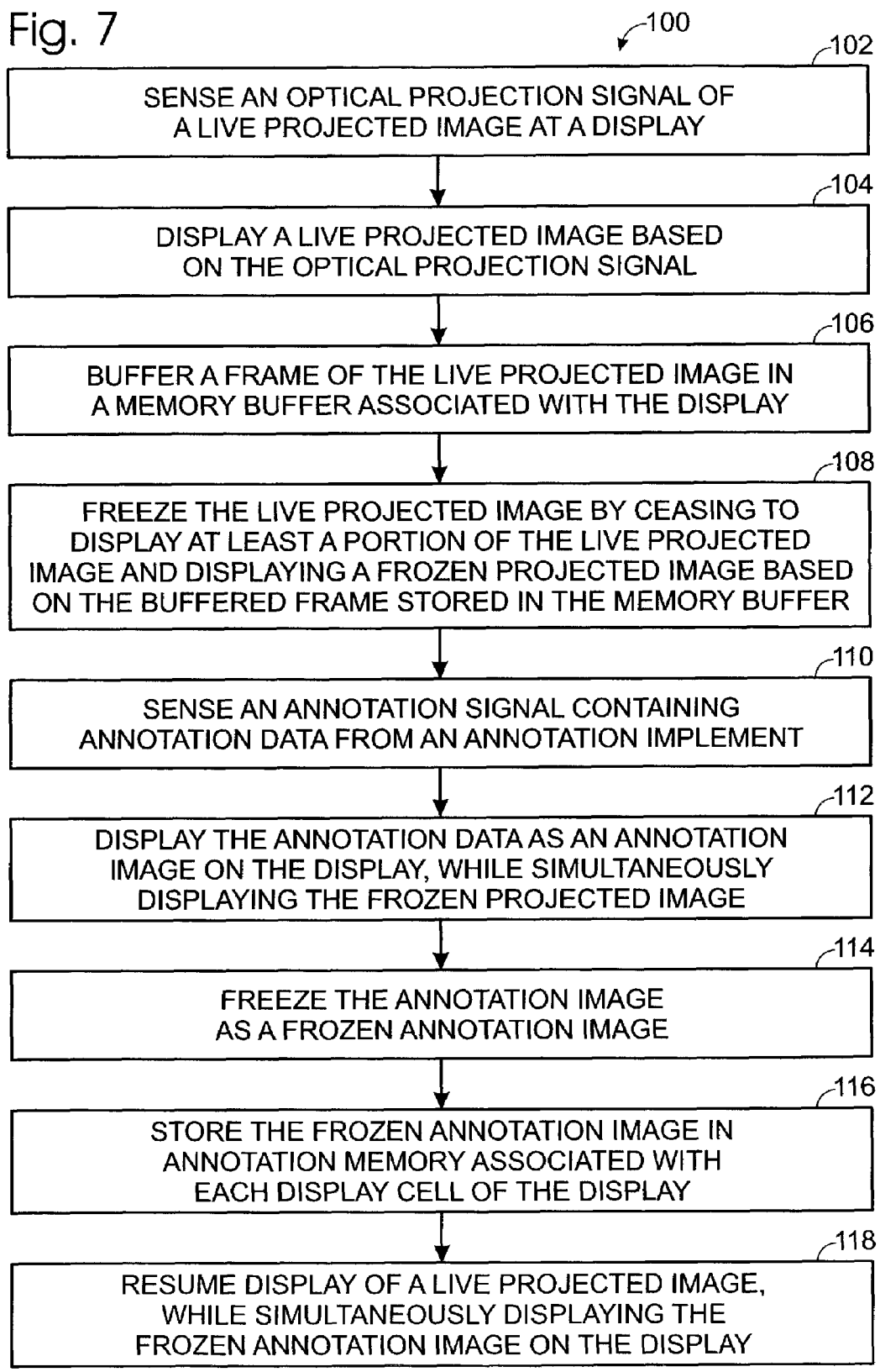

FREEZABLE PROJECTION DISPLAY

BACKGROUND

In recent years, multimedia projectors have become popular for presenting computer-based presentations to groups. Presenting material using projectors is often done in conjunction with a computer that includes presentation software. In the course of a multimedia presentation, it often becomes desirable to annotate an image being displayed. Prior projector methods required that the presenter annotate the image being presented using presentation software on a computer being used as the image source for the projector.

Annotating using presentation software is typically inconvenient as a presenter often must travel over to the computer in order to enter such annotations, which may detract from the quality of the presentation. Additionally, annotating images in such a manner may require modifying a source file for the presentation, which may be undesirable. Alternatively, images to be annotated may be projected on a writeboard or flip-chart and annotations may be made on the projection surface. However, this approach may result in poor image quality, interference with the projected image and difficulty in seeing annotations.

SUMMARY

A display system and method are provided. The system typically includes a display configured to control visible light, as well as to sense an optical signal projected thereon, the display being adapted to freeze a projected image by storing the optical signal associated with the live projected image in memory associated with the display and controlling visible light corresponding to the stored optical signal to form a frozen projection image.

BRIEF DESCRIPTION OF THE DRAWINGS

FIG. 1 is an isometric view of a display system according to one embodiment of the invention;

FIG. 2 is a fragmentary, more detailed plan view showing a control module and display cells of the display shown in FIG. 1;

FIG. 3 is an isometric view of an annotation implement and erasing implement according to one embodiment of the invention;

FIG. 4 is a block diagram of a display cell of the display depicted in FIG. 1;

FIG. 7 is a flowchart illustrating a display method according to an embodiment of the invention.

DETAILED DESCRIPTION OF THE PREFERRED EMBODIMENT

Figure 5:
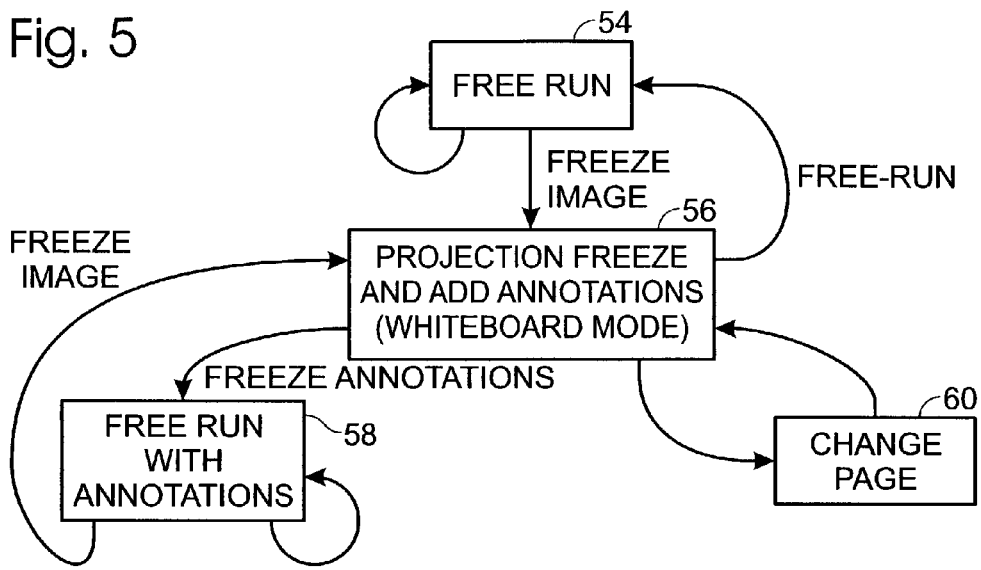
FIG. 5 is an operational state diagram of a display system depicted in FIG. 1.

FIG. 1 illustrates a display system 10 according to one embodiment of the invention. System 10 includes a display screen 12 configured to display an image transmitted to the display by image source 14 via an optical communications link 16. Display screen 12, also referred to herein simply as a display, is typically configured to control visible light, as well as to sense an optical projection signal projected thereon. The display is further adapted to freeze a live projected image from image source 14, by storing the optical projection signal associated with the live projected image in memory associated with the display and controlling visible light corresponding to the stored optical projection signal to form a frozen projection image 18.

System 10 typically further includes an annotation implement 20 configured to annotate the frozen projection image by transmitting annotation data to display 12 via an annotation signal 22, which may be an optical signal. The display is configured to receive the annotation signal and to display the annotation data as an annotation image 26 on the display, while simultaneously displaying the frozen projected image. The annotation image is typically superimposed on top of the frozen projected image, but may alternatively be placed behind, beside, above, below, or in some other orientation relative to the frozen projected image. The annotation image is typically opaque, but alternatively may be partially transparent. To use system 10, a user 24 typically positions annotation implement 20 adjacent display 12 and moves annotation implement 20 to either draw or erase annotations 26 on the frozen projection image.

Image source 14 is typically an optical projector that is configured to transmit an image to display 12 via an optical projection signal sent over an optical communication link 16. The optical communication link may be a nonvisible optical communication link and the optical signal may be encoded image data, or the optical communication link may be a visible light link in which the optical signal is visible light directly projected onto display 12. Where nonvisible light is used, the optical communication link is typically in the infrared spectrum, although other suitable frequency spectrums may be used. Because the image is transmitted via an optical communication link, it is described herein to be "projected" to the display. Thus, as used herein, the terms "projected image" and "projection image" are used to refer to an image that is sent from an image source 14 to a display 12 via an optical communication link 16, whether the image is transmitted using an optical projection signal encoded in nonvisible light such as infrared light, or the optical projection signal is directly projected as visible light.

As shown in FIG. 2, display 12 typically includes a control module 28 including a plurality of selectors 30 configured to enable a user to control the operations of display 12. Selectors 30 typically include a free run mode selector 30a, a projection freeze/add annotations mode selector 30b, a free run with annotations selector 30c, an erase annotations selector 30d, and a change annotations page selector 30e.

Also shown in FIG. 2, display 12 may include a plurality of display cells 42, discussed in detail below. These display cells typically are optically addressable by optical signals produced by devices such as the projection image source 14 and the annotation implement 20, described below. Thus, projection image source 14 may send an optical projection signal that is individually addressed to any or all of display cells 42. The display cells may receive these optical signals via sensors 44 (shown in FIG. 4), and emit corresponding light via light-emitting elements 46 (shown in FIG. 6), as discussed in detail below.

As shown in FIG. 3, annotation implement 20 may take the form of a stylus 20a, Stylus 20a typically includes a color selector 32 configured to select an annotation color from among a plurality of colors. The display is typically configured to display the selected annotation color. Stylus 20a may further include a draw/erase selector 34 configured to enable the user to select a draw mode in which the implement is configured to draw annotations on display 12, and an erase mode in which the implement is configured to erase portions of annotation image 26. During the erase mode, annotation signal 22 may be referred to as an erasing signal 22b, Typically, stylus 20a is configured to emit an annotation signal 22 that is a wireless signal. Stylus 20a may include an optical emitter 36 configured to emit an optical annotation signal 22, such as an infrared signal. As discussed below, the display typically includes a plurality of optical sensors configured to receive the optical annotation signal. Typically, annotation signal 22 is transmitted to optically addressable sensors contained within each of a plurality of display cells 42 of the display. Display cells that sense the annotation signal are configured to display annotation data as a portion of annotation image 26.

Alternatively, or in addition to stylus 20a, system 10 may include an annotation implement formed in the shape of an erasing implement 20b, Erasing implement 20b is typically configured to erase at least a portion of the annotation image 26 by transmitting erasure data to the display via an erasing signal 22b projected from emitter 40. Typically, erasing signal 22b is an optical signal (e.g. infrared) transmitted to optically addressable sensors contained within each of a plurality of display cells of the display. Erasing signal 22b typically is configured to cause display 12 to erase portions of annotation data 26 corresponding to the display cells 42 where the erasing signal is received. Typically, erasing implement 20b includes an on-off switch 38 configured to toggle the annotation signal on and off, such that the user can selectively erase portions of annotation image 26.

As shown in FIG. 4, each display cell 42 may include a sensor 44 configured to receive an optical projection signal corresponding to at least a portion of a live projected image, via optical communication link 16. The optical projection signal may be visible light, or nonvisible light, as discussed above. Sensor 44 is typically an optical sensor, such as an infrared sensor. Sensor 44 is also typically configured to receive an optical annotation signal 22, as discussed above.

Each of display cells 42 also may include a light-emitting element 46 configured to produce light. It will be appreciated that display cells 42 may be transmissive (i.e. configured to transmit light) or reflective (i.e. configured to reflect light), or a combination thereof. Typically, each display cell may further include image data memory 48 configured to store projected image data received via the optical sensor of the display cell, and annotation data memory 50 configured to store annotation data also received via the optical sensor of the display cell 42. In addition, each display cell 42 may include a multiplexer 52 configured to select light data for display by the display cell from either the image data memory or the annotation data memory. Typically, user selection of operation modes via control module 28 controls whether multiplexer 52 selects light data from image data memory or annotation data memory for display.

Figure 6:
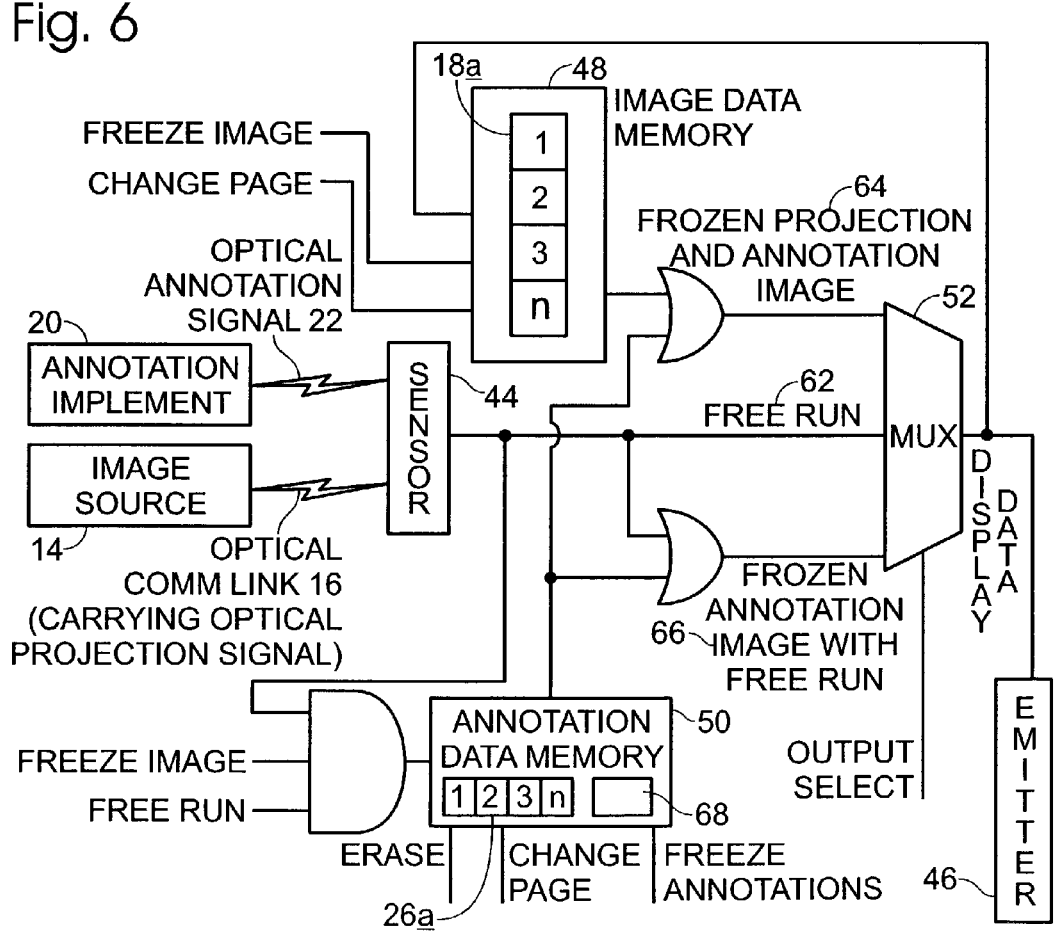
FIG. 6 is a more detailed schematic diagram of the display cell shown in FIG. 4.

For example, as shown in FIGS. 5 and 6, upon selection of selector 30a, display 12 may be configured to enter into a free run mode of operation 54, and multiplexer 52 may be configured to select the free run input 62 directly from sensor 44. This may cause display 12 to display the live projected image from image source 14. Upon selection of selector 30b, display 12 enters a projection freeze and add annotations mode of operation 56, in which the multiplexer is configured to select frozen projection and annotation image input 64 via which both the image data memory and the annotation data memory are provided. This causes frozen projection image 18, as well as user editable annotation image 26, to be displayed. The image source 14 may be configured to cease projecting all or part of the live projected image when the display is operating in the projection freeze mode of operation. Typically, when selecting the free run mode of operation 54 from the projection freeze and add annotations mode of operation 56, the display ceases to display at least a portion of the formerly displayed frozen projected image. In fact, the entire frozen projected image may be removed from the display and replaced with a live projected image.

Upon selection of selector 30c, the display is configured to enter into a free run with annotations mode of operation 58, in which multiplexer 52 may be configured to select frozen annotation image with free run input 66, which causes a frozen annotation image and a live projection image to be displayed. Typically, the entire display is caused to display both the live projection image and the frozen annotation image. Alternatively, only a portion of the display may be caused to display the live projection image and/or the frozen annotation image during the free run with annotations mode of operation.

Upon selection of erase annotations selector 30d, the display may be configured to erase all annotation data from annotation memory 50. The display may also be configured to clear a frozen projected image from image data memory 48.

As indicated, display 12 may include annotation data memory 50 configured to store a plurality of annotation image pages, as shown at 26a, Upon selection of change annotations page selector 30e, the display may be configured to enter into a change page mode of operation 60 in which the user may select an annotation image from among the plurality of annotation image pages for display. The display may be configured to display a plurality of annotation image pages at once, or may display each in succession. The annotation image pages may be displayed as opaque, or as partially transparent. These annotation images may be displayed superimposed on top of each other, but may alternatively be displayed adjacent to each other.

In addition, the display may include image data memory for storing a plurality of frozen projection image pages, as shown at 18a, The display may also include a selector on control module 28 that is configured to select a frozen projection image from among the plurality of frozen projection image pages for display.

Display 12 may be configured to display one or more preformatted background annotation images and/or foreground annotation images, shown at 68 in FIG. 6. Typically, these background/foreground images are stored in annotation data memory, and may be used, for example, to display electronic graph paper, an electronic ruler, etc., behind, in front of, or next to a live projected image.

FIG. 7 shows a display method 100 for use with a display according to one embodiment of the present invention. Method 100 typically includes, at 102, sensing or detecting an optical projection signal of a live projected image at an emissive display. Typically, the optical projection signal is an infrared signal, as described above. The optical projection signal of the live projected image is typically received by optical sensors associated with each of a plurality of display cells of display 12.

At 104, the method includes displaying a live projected image based on the optical projection signal. Displaying the image is typically accomplished by causing each of light-emitting elements 46 to emit light of an appropriate color to collectively form the live projected image. The optical projection signal received by each sensor of each display cell thus typically contains the light data necessary for causing the light-emitting element 46 of the display cell to emit an appropriate color and intensity of light to form the live projected image with the emitted light from other display cells.

At 106, the method includes buffering a frame of the live projected image in a memory buffer associated with the display. Typically, the frame of the live projected image is buffered on a pixel by pixel (or display cell by display cell) basis by temporarily storing the projected optical signal received at each sensor in display memory associated with each pixel or display cell.

At 108, the method includes freezing the live projected image by ceasing to display at least a portion of the live projected image, and displaying a frozen projected image based on the buffered frame stored in the image data memory buffer.

At 110, the method includes sensing or detecting an annotation signal containing annotation data from an annotation implement. The annotation signal is also typically an optical signal, such as an infrared signal, and is sensed by optical sensors, as described above.

At 112, the method typically includes displaying the annotation data as an annotation image on the display, while simultaneously displaying the frozen projected image. At 114, the method typically includes freezing the annotation image as a frozen annotation image. At 116, the method typically includes storing the frozen annotation image in annotation memory associated with each pixel, or display cell. At 118, the method further includes resuming display of a live projected image, while simultaneously displaying the frozen annotation image on the display.

While the embodiment of the present invention has been shown and described with particularity, those skilled in the art will understand that many variations may be made therein without departing from the spirit and scope of the invention as defined in the following claims. The present description thus should be understood to include all novel and non-obvious combinations of elements described herein, and claims may be presented in this or a later application to any novel and non-obvious combination of these elements. The foregoing embodiment is illustrative, and no single feature or element is essential to all possible combinations that may be claimed in this or a later application. Where the claims recite "a" or "a first" element or the equivalent thereof, such claims should be understood to include incorporation of one or more such elements, neither requiring nor excluding two or more such elements.

What is claimed is:

1. A display system for use with a projection image source, the display system comprising:
   a display screen including
     a plurality of sensors configured to sense an optical signal projected thereon by a projection image source that is not included in the display screen, the optical signal being associated with a live projected image, and
     memory for storing the optical signal that is sensed,
   wherein the display screen is configured to form a frozen projection image corresponding to the live projected image by controlling light based on the optical signal sensed by the sensors and stored in the memory.

2. The display system of claim 1, further comprising:
   an annotation implement configured to annotate the frozen projection image by transmitting annotation data to the display screen via an annotation signal.

3. The display system of claim 2, wherein the display screen is configured to receive the annotation signal and to display the annotation data as an annotation image, while simultaneously displaying the frozen projection image.

4. The display system of claim 3, wherein the annotation image and the frozen projection image are at least partially superimposed.

5. The display system of claim 1, wherein each sensor is configured to detect light related to the live projected image, as well as the annotation signal.

6. The display system of claim 3, wherein the frozen projection image is configured to be displayed during a projection freeze mode of operation of the display screen.

7. The display system of claim 6, wherein the display screen further includes a selector configured to enable a user to select the projection freeze mode of operation.

8. The display system of claim 7, further comprising a projector that is the projection image source, wherein the projector is configured to cease projecting the live projected image upon the display screen entering the projection freeze mode of operation.

9. The display system of claim 8, wherein the projector is configured to project the live projected image to the display screen using nonvisible light.

10. The display system of claim 9, wherein the projector is configured to project the live projected image to the display screen using infrared light.

11. The display system of claim 6, wherein the display screen is configured to receive the annotation signals and display the annotation image during the projection freeze mode of operation.

12. The display system of claim 3, wherein the display screen is further configured to operate in a free run mode of operation in which the projected image is projected live from the projection image source and in which the display screen ceases to display at least a portion of the frozen projection image.

13. The display system of claim 12, wherein the display screen further includes a selector configured to enable a user to select the free run mode of operation.

14. The display system of claim 3, wherein the display screen is further configured to operate in a free run with annotations mode of operation, in which both an annotation image and a live projection image are displayed.

15. The display system of claim 14, wherein the annotation image displayed during the free run with annotations mode of operation is a frozen annotation image.

16. The display system of claim 15, wherein at least part of the frozen projection image is not displayed during the free run with annotations mode of operation.

17. The display system of claim 14, wherein the display screen further includes a selector configured to enable a user to select the free run with annotations mode of operation.

18. The display system of claim 3, wherein the display screen includes a selector configured to enable a user to clear an annotation image.

19. The display system of claim 3, wherein the display screen includes a selector configured to enable a user to clear a frozen projection image.

20. The display system of claim 3, wherein the display screen includes memory for storing a plurality of annotation image pages.

21. The display system of claim 20, wherein the display screen includes a selector configured to select an annotation image from among the plurality of annotation image pages for display.

22. The display system of claim 21, wherein the display screen is configured to display a plurality of annotation image pages at once.

23. The display system of claim 22, wherein the plurality of annotation image pages are displayed as partially transparent.

24. The display system of claim 22, wherein the plurality of annotation image pages are displayed on top of each other.

25. The display system of claim 3, wherein the display screen includes memory for storing a plurality of frozen projection image pages.

26. The display system of claim 25, wherein the display screen includes a selector configured to select a frozen projection image from among the plurality of frozen projection image pages for display.

27. The display system of claim 3, further comprising:
an erasing implement configured to erase at least a portion of the annotation image by transmitting erasure data to the display screen via an erasing signal.

28. The display system of claim 27, wherein the erasing implement is further configured to erase at least a portion of the frozen projection image by transmitting erasure data to the display screen via the erasing signal.

29. The display system of claim 28, wherein the erasing signal is an optical signal transmitted to the sensors.

30. The display system of claim 3, wherein the display screen is configured to display multiple pages of annotation images.

31. The display system of claim 1, wherein the display screen is configured to display one or more preformatted background annotation images and/or foreground annotation images, in connection with the frozen projection image and live projection images.

32. A display system for use with a projection image source, the display system comprising:
a display screen configured to sense an optical projection signal projected thereon by a projection image source that is not included in the display screen, to store the sensed optical projection signal in memory of the display screen, and to control visible light based on the stored optical projection signal to form a frozen projection image corresponding to the optical projection signal; and
an annotation implement configured to annotate the frozen projection image by transmitting annotation data to the display screen via an annotation signal;
wherein the display screen is configured to receive the annotation signal and to display the annotation data as an annotation image on the display screen, while simultaneously displaying the frozen projection image, and
wherein the display screen displays the frozen projection image and the annotation image by controlling visible light that is not from the projection image source.

33. The display system of claim 32, wherein the annotation implement includes a color selector configured to select an annotation color from among a plurality of colors, and wherein the display screen is configured to display the selected annotation color.

34. The display system of claim 32, wherein the annotation implement includes an erase mode in which the annotation implement is configured to erase portions of the annotation image.

35. The display system of claim 32, wherein the annotation signal is an infrared signal.

36. The display system of claim 32, wherein the optical projection signal is an infrared light signal.

37. A display system for use with a projection image source, the display system comprising:

a display screen including a plurality of display cells arranged to form an image display area, each display cell including an optical sensor configured to detect an optical projection signal containing at least a portion of a live projected image from the projection image source, each display cell further including a light-emitting element configured to produce light, the display screen being adapted to freeze the live projected image by storing the optical projection signal associated with the live projected image in memory included with the display screen and controlling visible light corresponding to the stored optical projection signal to form a frozen projection image; and
an annotation implement configured to annotate the frozen projection image by transmitting annotation data to the display screen via an annotation signal;
wherein the optical sensor of each display cell is configured to detect the annotation signal, and to cause the light-emitting element associated with the display cell to emit a portion of an annotation image.

38. The display system of claim 37, wherein each display cell further includes image data memory configured to store projected image data received via the optical sensor of the display cell.

39. The display system of claim 38, wherein each display cell further includes annotation data memory configured to store annotation data received via the optical sensor of the display cell.

40. The display system of claim 39, wherein each display cell further includes a multiplexer configured to select light data for display on the display cell from either the image data memory or the annotation data memory.

41. A display screen comprising:
a plurality of display cells arranged to form an image display area, each display cell including
an optical sensor configured to detect an optical signal containing at least a portion of a live projected image from a projection image source, the optical sensor further being configured to detect an annotation signal from an annotation implement,
image data memory configured to store projected image data received via the optical sensor of the display cell,
annotation data memory configured to store annotation data received via the optical sensor of the display cell, and
a light-emitting element configured to produce visible light based on the projected image data and/or the annotation data.

42. The display screen of claim 41, further comprising:
a multiplexer configured to select data stored in the image data memory and/or the annotation data memory for display via the light-emitting element of one or more of the display cells.

43. The display screen of claim 41, wherein the optical sensor is an infrared sensor, and the optical signal and annotation signal are infrared signals.

44. A display method for use with a display screen, the method comprising:
sensing an optical projection signal with a display screen;
displaying a live projected image with the display screen based on the sensed optical projection signal;
buffering a frame of the live projected image in a memory buffer of the display screen; and freezing the live projected image by ceasing to display at least a portion of the live projected image and displaying a frozen projected image with the display screen based on the buffered frame stored in the memory buffer.

45. The display method of claim 44, further comprising: sensing an annotation signal containing annotation data.

46. The display method of claim 45, further comprising: receiving the annotation signal from an annotation implement.

47. The display method of claim 45, further comprising: displaying the annotation data as an annotation image on the display screen.

48. The display method of claim 45, further comprising displaying the annotation data as an annotation image on the display screen, while simultaneously displaying the frozen projected image.

49. The display method of claim 48, further comprising freezing the annotation image as a frozen annotation image.

50. The display method of claim 49, further comprising storing the frozen annotation image in annotation memory associated with each display cell of the display screen.

51. The display method of claim 50, further comprising resuming display of a live projected image, while simultaneously displaying the frozen annotation image on the display screen.

52. The display method of claim 45, further comprising receiving the annotation signal from an annotation implement via an optical sensor.

53. The display method of claim 52, wherein the optical sensor is an infrared sensor.

54. The display method of claim 44, wherein each display cell of the display screen includes an associated optical sensor, the method further comprising receiving the projected optical projection signal for the live projected image at the optical sensors associated with the display cells.

55. The display method of claim 54, further comprising buffering the frame of the live projected image on a pixel by pixel basis, by temporarily storing the projected optical signal received at each sensor in display memory associated with each display cell.

* * * * *